US012625323B2

(12) United States Patent
Yang et al.

(10) Patent No.: US 12,625,323 B2
(45) Date of Patent: May 12, 2026

(54) IN-FIBER OPTICAL MICRORESONATORS AND COUPLERS

(71) Applicant: VIRGINIA TECH INTELLECTUAL PROPERTIES, INC., Blacksburg, VA (US)

(72) Inventors: Shuo Yang, Blacksburg, VA (US); Anbo Wang, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 439 days.

(21) Appl. No.: 18/549,439

(22) PCT Filed: Mar. 31, 2022

(86) PCT No.: PCT/US2022/022724
§ 371 (c)(1),
(2) Date: Sep. 7, 2023

(87) PCT Pub. No.: WO2022/212629
PCT Pub. Date: Oct. 6, 2022

(65) Prior Publication Data
US 2024/0159968 A1 May 16, 2024

Related U.S. Application Data

(60) Provisional application No. 63/170,160, filed on Apr. 2, 2021.

(51) Int. Cl.
*G02B 6/293* (2006.01)

(52) U.S. Cl.
CPC .................................. *G02B 6/29341* (2013.01)

(58) Field of Classification Search
CPC .............. G02B 6/29341; G02B 6/2733; G02B 2006/12138

(Continued)

(56) References Cited

U.S. PATENT DOCUMENTS

| | | | | |
|---|---|---|---|---|
| 5,321,257 A | * | 6/1994 | Danisch ............... | G02B 6/2852 250/227.16 |
| 7,646,945 B2 | * | 1/2010 | Jones ..................... | G01L 1/246 385/12 |

(Continued)

FOREIGN PATENT DOCUMENTS

| | | |
|---|---|---|
| CN | 105353459 A | 2/2016 |
| WO | 0216986 A1 | 2/2002 |
| WO | 2009156410 A1 | 12/2009 |

OTHER PUBLICATIONS

"In-fiber whispering-gallery-mode resonator fabricated by femto-second laser micromachining" by Shi et al, Optics Letters, vol. 40, No. 16, pp. 3770-3773 (Year: 2015).*

(Continued)

*Primary Examiner* — Robert Tavlykaev

(74) *Attorney, Agent, or Firm* — Perilla Knox Hildebrandt Staley & Amy LLP; Stephanie L. Davy-Jow; Jason M. Perilla

(57) ABSTRACT

A method for forming an optical fiber having at least one of a microresonator and a coupler integrated therein is described. The method includes providing an optical fiber having a light guiding core, modifying at least one region of the optical fiber using a laser, immersing the optical fiber having the at least one region as modified inside an etchant that selectively etches the at least one region as modified to generate at least one of a microresonator and a coupler integrated in the optical fiber, and removing the optical fiber from the etchant. The optical fiber as removed from the etchant may include the at least one of the microresonator and the coupler. The method may further include heating the optical fiber using, for example, a $CO_2$ laser or other heating apparatus, to smoothen surface irregularities of at least one of the microresonator and the coupler.

18 Claims, 8 Drawing Sheets

(58) Field of Classification Search
    USPC ........................................ 385/12, 15, 31, 32
    See application file for complete search history.

(56)                    References Cited

U.S. PATENT DOCUMENTS

| | | | |
|---|---|---|---|
| 10,578,594 B2 * | 3/2020 | Tadigadapa .......... | G01N 33/487 |
| 11,650,370 B1 * | 5/2023 | Chandrahalim ... | G02B 6/29341 |
| | | | 385/30 |
| 2010/0209045 A1 * | 8/2010 | Okayama ............. | G02B 6/4215 |
| | | | 385/12 |

OTHER PUBLICATIONS

"Femtosecond laser direct writing of high-Q microresonators in glass and crystals" by Lin et al, Proc. of SPIE, vol. 9343, paper 934310 (Year: 2015).*

"Fabrication of High-Q Microresonators using Femtosecond Laser Micromachining" by Tada et al, CLEO Technical Digest, paper CM1M.6 (Year: 2012).*

"An In-Fiber Coupler for Whispering-Gallery-Mode Excitation in a Microsphere Resonator" by Bai et al, IEEE Photonics Technology Letters, vol. 32, No. 4, pp. 188-191 (Year: 2010).*

International Search Report and Written Opinion for PCT/US2022/022724 mailed Jul. 26, 2022.

* cited by examiner

Sphere    Cylinder/Disk    Toroid    Polygon

Waveguide    Free Space    Total Internal Reflection

Single-Mode    Multimode    Off-Center Core    Multicore    Multi-cladding    Exotic Shape

FIG. 6

TOP VIEW

SIDE VIEW

TOP VIEW

SIDE VIEW

IN-FIBER OPTICAL MICRORESONATORS AND COUPLERS

CROSS-REFERENCE TO RELATED APPLICATION

This application is a 371 U.S. National Stage Application of PCT Application Serial Number PCT/US2022/022724 filed on Mar. 31, 2022, which application claims the benefit of and priority to U.S. Provisional Patent Application No. 63/170, 160 filed Apr. 2, 2021 entitled "IN-FIBER OPTICAL MICRORESONATORS," the contents of both of which being incorporated by reference in their entirety herein.

BACKGROUND

Optical-fiber cables include cables having one or more optical fibers that are used to carry light for purposes of long-distance communication, high-speed data transmission, sensing, and the like. Optical fibers may include resonating cavities, referred to as optical resonators (or simply resonators) which provide an arrangement of glass or mirrors that manipulate light waves. Based on manipulations of light, resonators provide various feedback and measurements relating to a signal transmitted by an optical fiber. Today, manipulating an optical fiber to include a resonator is an incredibly delicate and burdensome task, often requiring cladding or other material to be surgically removed and portions of the optical fiber to be etched physically using a sharp tool or chemically with a compatible etchant.

BRIEF SUMMARY

Various embodiments are disclosed for in-fiber optical microresonators, couplers, and like components. In a first aspect, a method for forming an optical fiber having a microresonator and a coupler integrated therein is described that includes providing an optical fiber having a light guiding core, modifying a first region of the optical fiber as an intended region for the microresonator and a second region of the optical fiber as an intended region for the coupler using an ultrafast laser, immersing the optical fiber having the first region and the second region as modified inside an etchant that selectively etches the first region and the second region as modified to generate the microresonator and the coupler integrated in the optical fiber at the light guiding core, wherein the etchant is hydrofluoric acid (HF), potassium hydroxide (KOH), or a combination thereof, removing the optical fiber from the etchant, and heating the optical fiber to smoothen surface irregularities of the microresonator and the coupler, wherein heating the optical fiber comprises performing a laser reflow process on the optical fiber using a carbon dioxide ($CO_2$) laser that irradiates and heats the optical fiber, or performing direct heating wherein the heating apparatus is a furnace, electric arcs, flame, or a combination thereof.

Modifying the first region and the second region of the optical fiber using the ultrafast laser may include adjusting a pulse width of the ultrafast laser to a femtosecond or a picosecond setting, and adjusting a wavelength of the ultrafast laser to ultraviolet, visible, or near-infrared. The microresonator may have a shape selected from a group consisting of a sphere, a cylinder, a toroid, and a polygon, and the coupler may be one of a waveguide coupler, a free-space coupler; and a total-internal-reflection (TIR) coupler. In some aspects, the microresonator may be a first microresonator, the optical fiber includes a second microresonator; and the coupler couples the first microresonator and the second microresonator. The coupler may couple the first microresonator and the second microresonator in an axial dimension, for example, or in an azimuthal dimension. Further, it is understood that the coupler may couple three or more microresonators in an axial dimension, in an azimuthal dimension, or a combination thereof.

In a second aspect, a method for forming an optical fiber having at least one of a microresonator and a coupler integrated therein is described that includes providing an optical fiber having a light guiding core, modifying at least one region of the optical fiber using a laser, immersing the optical fiber having the at least one region as modified inside an etchant that selectively etches the at least one region as modified to generate at least one of a microresonator and a coupler integrated in the optical fiber at the light guiding core, and removing the optical fiber from the etchant, wherein the optical fiber as removed from the etchant comprises the at least one of the microresonator and the coupler. The method may further include, after removing the optical fiber from the etchant, heating the optical fiber to smoothen surface irregularities of the at least one of the microresonator and the coupler.

Heating the optical fiber may include, for example, performing a laser reflow process on the optical fiber using a carbon dioxide ($CO_2$) laser that heats and irradiates the optical fiber, or performing direct heating wherein the heating apparatus is a furnace, electric arcs, a flame, a $CO_2$ laser, or a combination thereof. Modifying the at least one region of the optical fiber using the laser may include adjusting a pulse width of the laser to a femtosecond or a picosecond setting, and adjusting a wavelength of the laser to ultraviolet, visible, or near-infrared. The laser may be an ultrafast laser, for example. The etchant may include hydrofluoric acid (HF), potassium hydroxide (KOH), or a combination thereof. The optical fiber may include a glass fiber. For instance, the glass fiber may be pure-fused silica. In some aspects, the glass fiber is doped silica doped using a dopant selected from a group consisting of germanium (Ge), phosphorus (P), fluorine (F), and rare earth ions (erbium (Er), ytterbium (Yb), neodymium (Nd), thulium (Tm), praseodymium (Pr), holmium (Ho).

A shape of the optical fiber may be one of cylindrical, rectangular, triangular, and polygonal, and a size of the optical fiber is in a range of tens of micrometers or tens of sub-millimeters. In some aspects, the optical fiber comprises the microresonator and the coupler, the microresonator has a shape selected from a group consisting of: a sphere, a cylinder, a toroid, and a polygon, and the coupler is one of: a waveguide coupler; a free-space coupler; and a total-internal-reflection coupler. The optical fiber may include the microresonator, the microresonator being one of a plurality of microresonators integrated in the optical fiber, and the optical fiber comprises the coupler, the coupler being one of a plurality of couplers integrated in the optical fiber. In another aspect, an optical fiber is described that is formed according to the method in the preceding aspects.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6 illustrates an example of a fabrication process of the optical fiber of FIG. 1 according to various embodiments of the present disclosure.

DETAILED DESCRIPTION

The present disclosure relates to in-fiber optical components or, more specifically, to in-fiber optical resonators (e.g., microresonators) and in-fiber optical couplers. More specifically, a fiber-optic device and a method of formation thereof are described having self-contained optical microresonators and/or coupler structures. As noted above, today, manipulating an optical fiber to include a resonator is an incredibly delicate and burdensome task, often requiring cladding or other material to be surgically removed and portions of the optical fiber to be etched physically using a sharp tool or chemically with a compatible etchant. Accordingly, various embodiments are described herein for a small or miniature fiber-optic device that consists self-contained optical micro-resonators and coupler structures. Microresonators and/or couplers may be integrated inside an optical fiber using a non-invasive technique, for instance, without removing cladding. Each microresonator may be function as a sensor for measurement of various physical parameters, chemical properties, and biological species, and the like, a spectral filtering element for telecommunication applications, such as frequency selection and optical switching, and/or an optical nonlinear medium to generate light with new frequencies.

Figure 1:
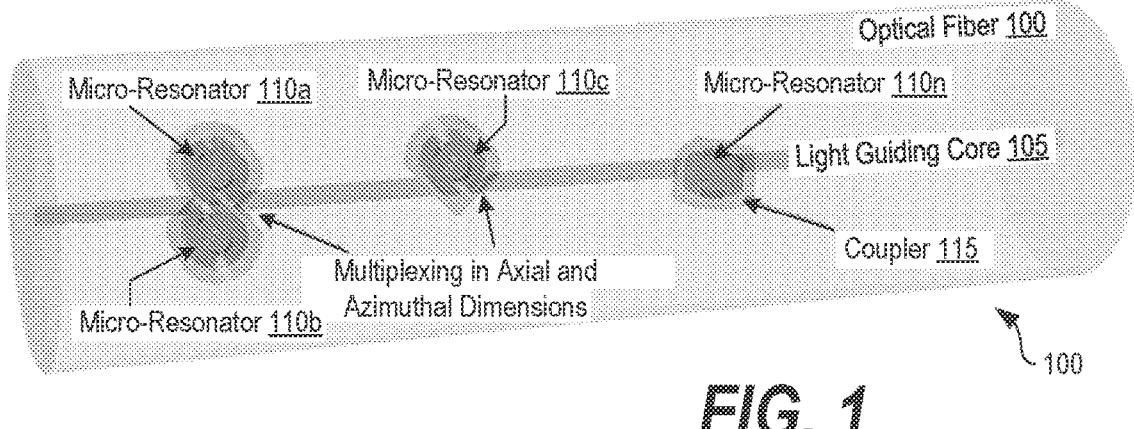
FIG. 1 illustrates examples of an optical fiber having various examples of in-fiber devices (e.g., microresonators and/or couplers) according to various embodiments of the present disclosure.
Figure 2:
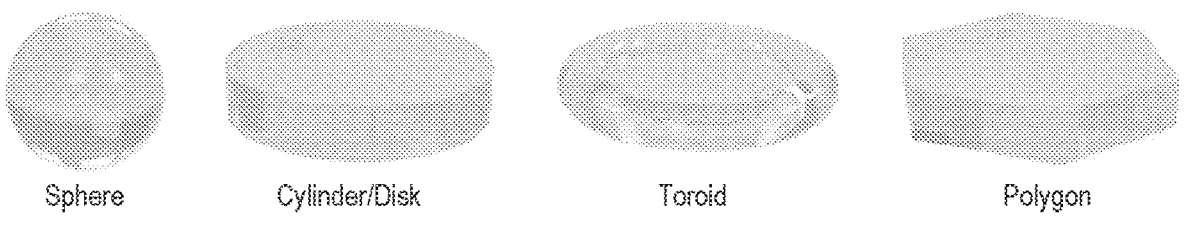
FIG. 2 illustrates examples of possible shapes of an in-fiber microresonator in the optical fiber of FIG. 1 according to various embodiments of the present disclosure.
Figure 3:
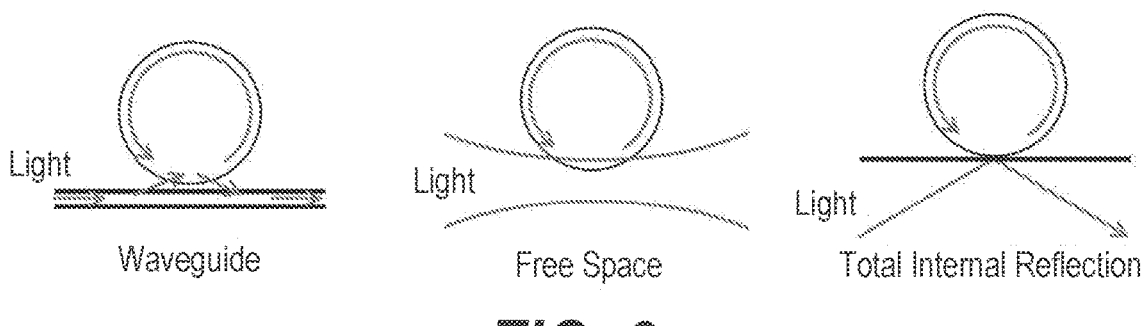
FIG. 3 illustrates example types of in-fiber couplers for the optical fiber of FIG. 1 according to various embodiments of the present disclosure.
Figure 4:
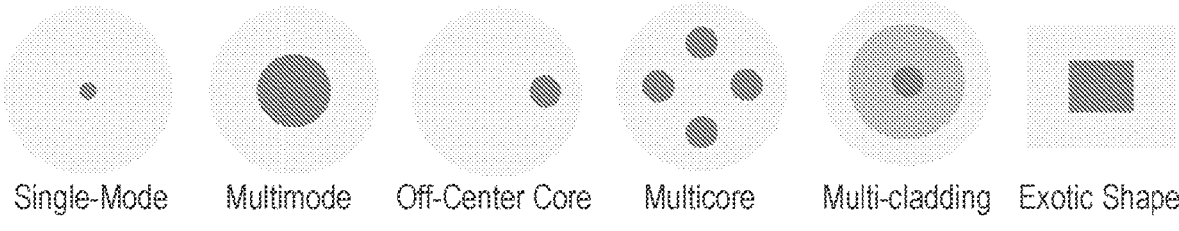
FIG. 4 illustrates examples of differing types of an optical fiber having one or more of the in-fiber microresonators and/or in-fiber couplers of FIG. 1 according to various embodiments of the present disclosure.

Turning now to FIG. 1, a schematic diagram of a non-limiting example of an optical fiber 100 is shown according to various embodiments. The optical fiber 100 includes a light-guiding core 105 and one or more microresonators 110 (or, in other words, at least one microresonator 110). Additionally, in various embodiments, the optical fiber 100 may include couplers 115 that couple a microresonator 105 to another microresonator 110. In various embodiments, the microresonators 110 and/or the couplers 115 may be integral with and integrated inside the optical fiber 100. Each microresonator 110 may function as, but not limited to, a sensor for measurement of physical parameters, chemical properties, biological species, and the like, a spectral filtering element for telecommunication applications, such as frequency selection and optical switching, and/or an optical nonlinear medium to generate light with predetermined frequencies. The microresonators 110 may be formed integral with the coupler 115 and/or optical fiber 100.

The optical fiber 100 having the microresonators 110 and/or couplers 115 have various advantages of the existing state of the art. Notably, a miniature and high-aspect ratio geometry offers minimal intrusion, a capability with single-port readout is offered, a potentially all-glass construction ensures chemical and mechanical stability, and a batch fabrication process can be utilized.

Figure 5A:
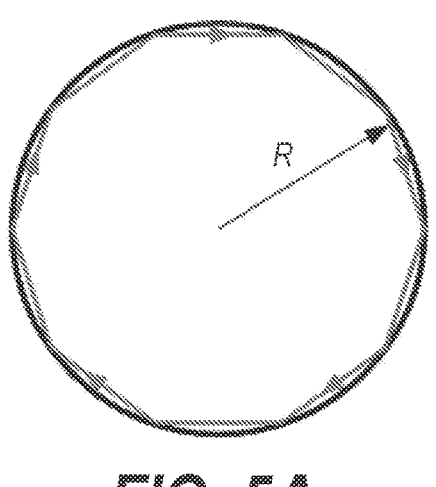
FIG. 5A illustrates an example of a geometric optic representation of a circular whispering gallery mode (WGM) cavity according to various embodiments of the present disclosure.

Light circulating in a microresonator 105 of the optical fiber may be referred as whispering gallery mode (WGM). A typical path for a whispering gallery mode inside a circular cavity is plotted in FIG. 5A, which has a polygon shape. A higher order of a polygon may mean a higher order of resonance, for example. If a circumference of the polygon equals to an integer times of a wavelength in a medium, $m\lambda/n$, constructive interference takes place. Usually for dielectric WGM cavity, a radius is in the order of tens to hundreds of μm and the operating wavelength is located from visible to near infrared. Thus, radius $R \gg \lambda$ and the interference condition, phase-matching condition, can be approximately written as:

$$m\frac{\lambda_m}{n} \approx 2\pi R. \tag{1}$$

Figure 5B:
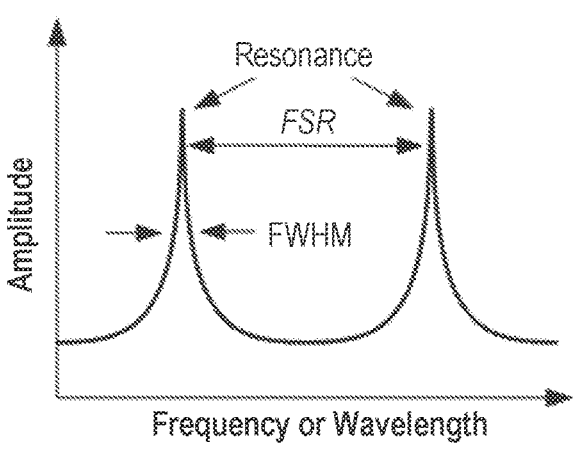
FIG. 5B illustrates an example of a typical whispering gallery mode spectrum according to various embodiments of the present disclosure.

A typical spectrum indicating the amount of energy stored in the cavity at different wavelengths is illustrated in FIG. 5B. A widely used parameter, free spectral range (FSR), defined as a separation between two successive modes can be written as $$FSR = \lambda_m - \lambda_{m-1} = \frac{\lambda_m \lambda_{m-1}}{2\pi n R} \approx \frac{\lambda_m^2}{2\pi n R}. \tag{2}$$

The resonance has a Lorentzian shape with linewidth $\Delta\lambda$ as:

$$S \propto \frac{1}{1 + \left(\dfrac{\lambda - \lambda_m}{\Delta\lambda/2}\right)^2}. \tag{3}$$

The narrow resonant peaks enable ultrafine wavelength selection, fast optical switching, and highly sensitive sensing.

The glass fiber used in the fabrication could be pure fused silica or doped silica. The dopants could be but not limited to germanium (Ge), phosphorus (P), fluorine (F), and rare earth ions (erbium (Er), ytterbium (Yb), neodymium (Nd), thulium (Tm), praseodymium (Pr), holmium (Ho). The configuration of the fiber could be but not limited to single-mode fiber, few-mode fiber, multi-mode fiber, off-centered core fiber, multi-core fiber, and multi-cladding fiber. The shape of the fiber could be but not limited to cylindrical, rectangular, triangular, and polygonal. The size of fiber could be in the range of tens of micrometer to sub-millimeter. In some embodiments, the coupler 115 may couple two or more microresonators 110 (e.g., two microresonators 110, three microresonators 110, four microresonators 110, and so forth) in an axial dimension, in an azimuthal dimension, or a combination thereof.

Figure 6:
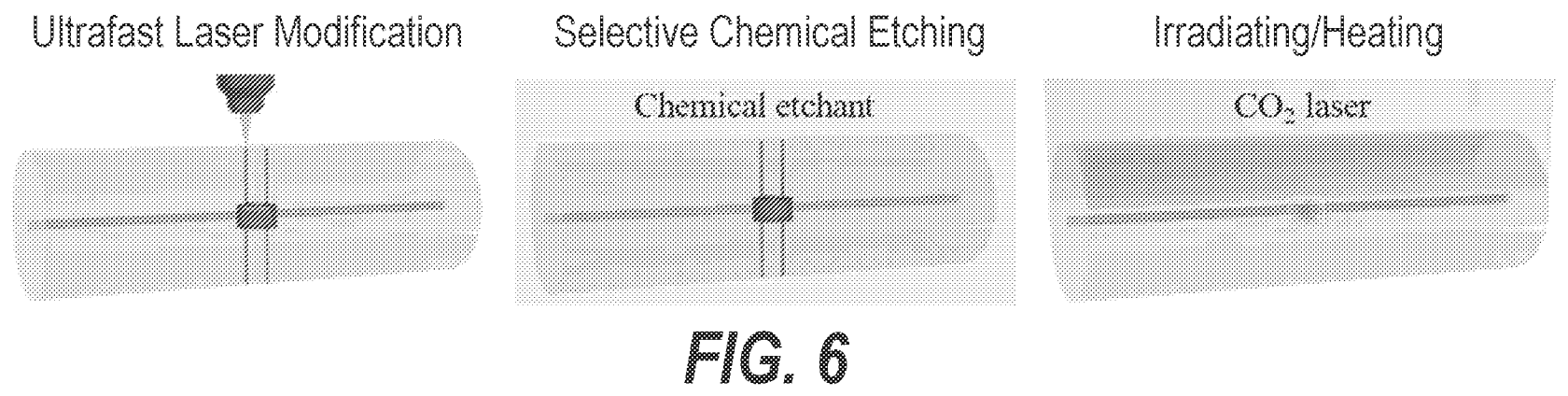

The fabrication incudes three steps as shown in FIG. 6. A first process may include using a laser (e.g., an ultrafast laser) to modify regions that need to be removed, referred to herein as intended regions. A pulse width of the ultrafast laser may be femtosecond or picosecond, and the wavelength may be ultraviolet, visible, and near infrared. The structure shown in FIG. 6 is merely just an example, and it is understood that a single or multiple structures, such as those shown in FIG. 1, may be integrated into an optical fiber 100. Thereafter, the optical fiber 100 may be immersed inside an etchant to selectively etch away a region as modified by the laser. The etchant may include, for example, hydrofluoric acid (HF), potassium hydroxide (KOH), a combination thereof, or other suitable etchant. A concentration and temperature of the etchant solution may be adjusted for the fabrication and therefore may be selected depending on desired processing speeds and controllability. Finally, a laser reflow by a carbon dioxide ($CO_2$) laser may be employed although other heating methods may be employed. The optical fiber 100 may be irradiated and heated by the $CO_2$ laser, for example, that turns a modified region, or portion thereof, into viscous fluid. The surface tension drives the modified region to reflow and smoothens surface irregularities, if any, resulting in an optical grade surface quality.

The proposed technique offers a three-dimensional mask-free fabrication, and therefore various structures can be implemented. The structure of the microresonator 110 may include, but is not limited to sphere, cylinder, toroid, and polygon. The coupler 115 could be, but is not limited to, waveguide coupling, free-space coupling, total-internal-reflection (TIR) coupling, and so forth.

Figure 7A:
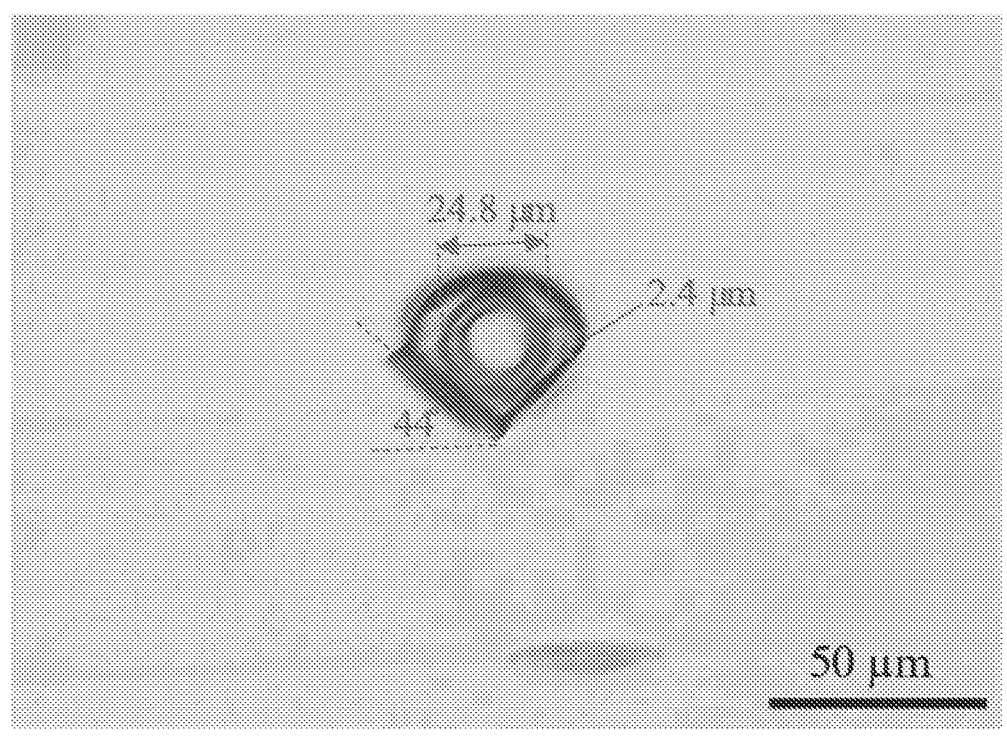
FIGS. 7A and 7B show examples of an in-fiber microresonator having a cylinder-shaped resonator and a totally-internal-reflection (TIR) coupling structure from a top view and a side view, respectively, according to various embodiments of the present disclosure.
Figure 7B:
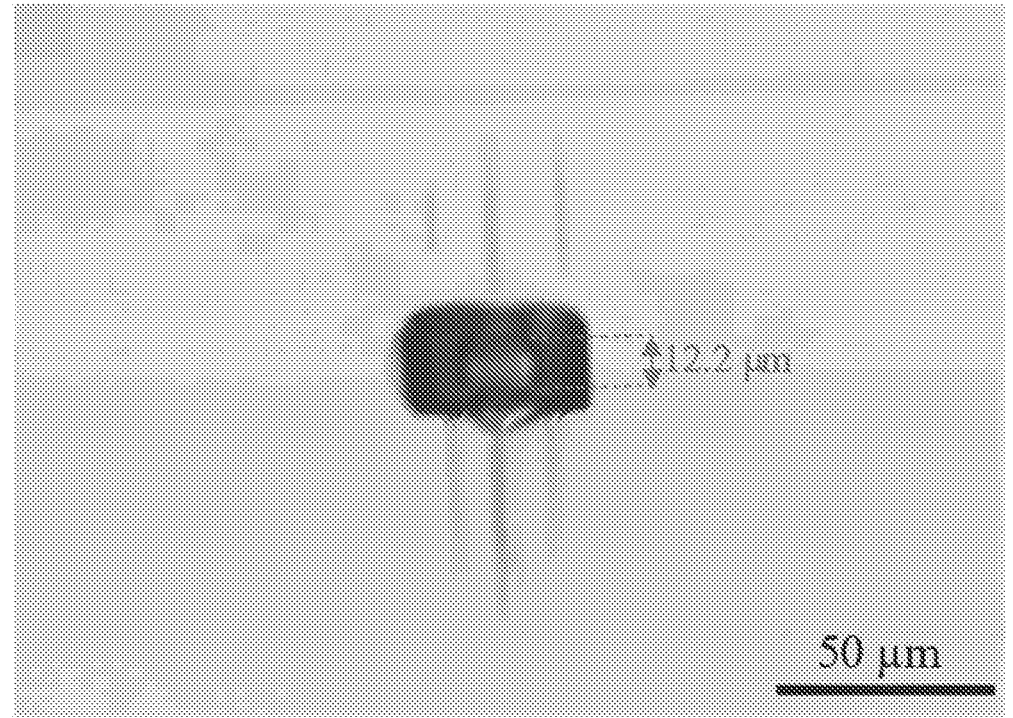
Figure 8A:
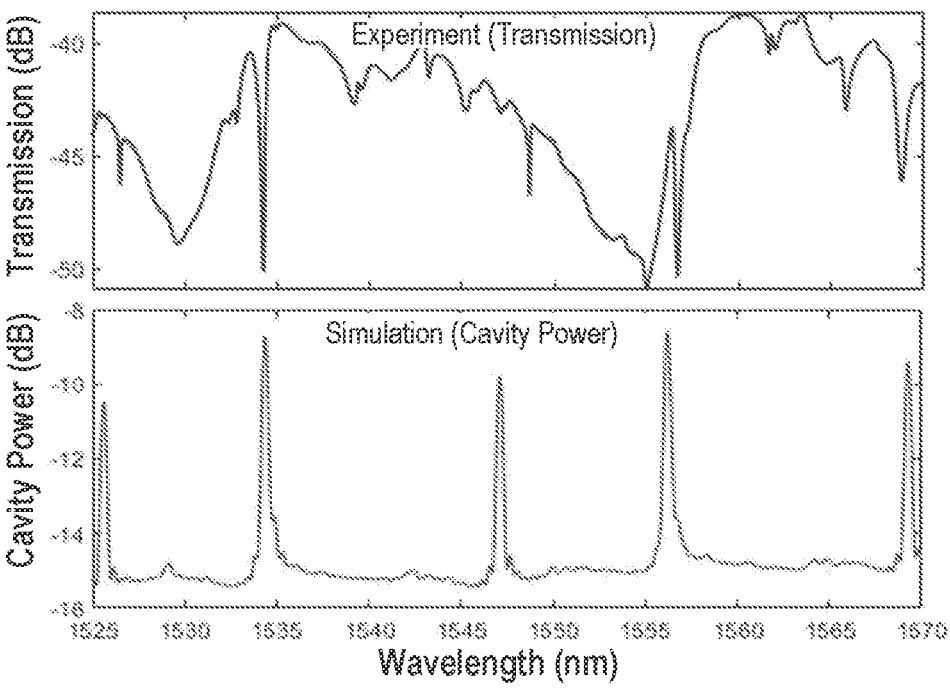
FIG. 8A illustrates examples of a measured transmission spectrum and simulated cavity power spectrum of the totally-internal-reflection coupling structure shown in FIGS. 7A and 7B according to various embodiments of the present disclosure.
Figure 8B:
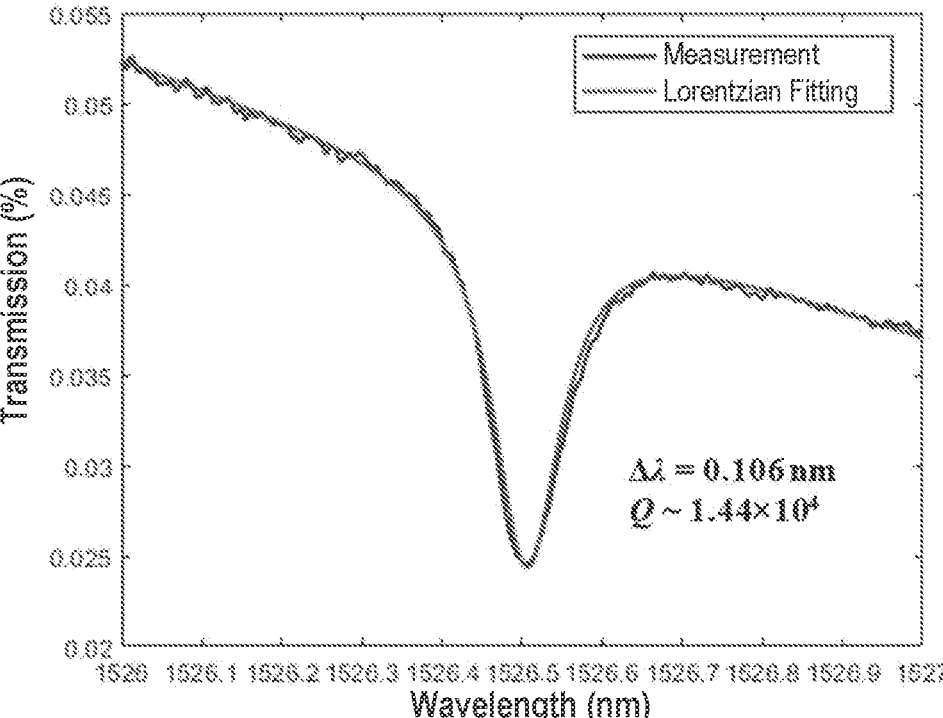
FIG. 8B illustrates an example resonance and an example of Lorentzian fitting of the TIR coupling structure shown in FIGS. 7A and 7B according to various embodiments of the present disclosure.
Figure 9A:
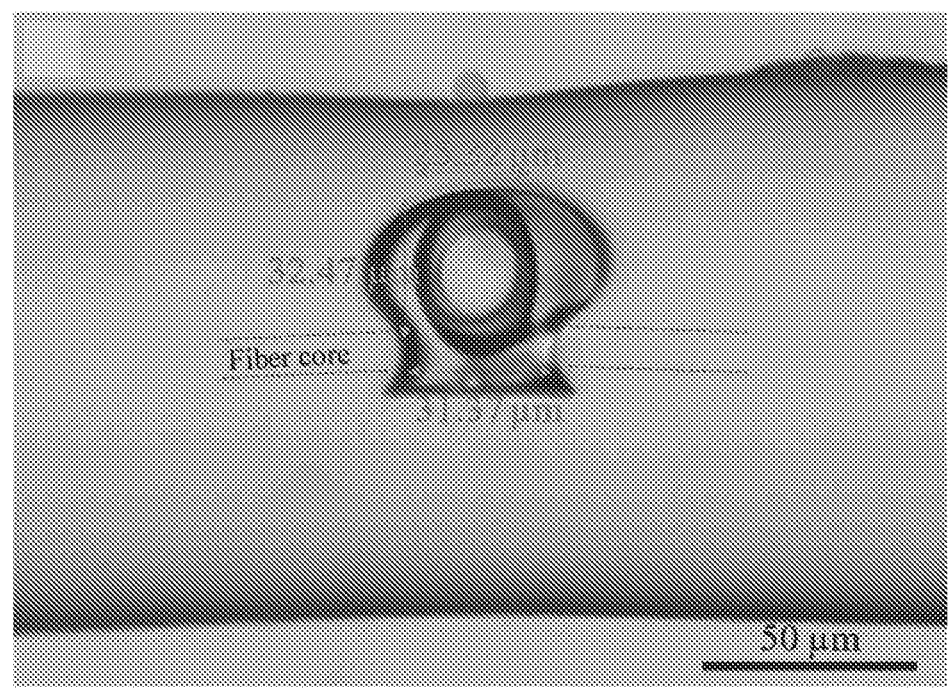
FIGS. 9A and 9B show an example of an in-fiber microresonator device with an oval-shaped microresonator and a free space coupling structure from a top view and a side view, respectively, according to various embodiments of the present disclosure.
Figure 9B:
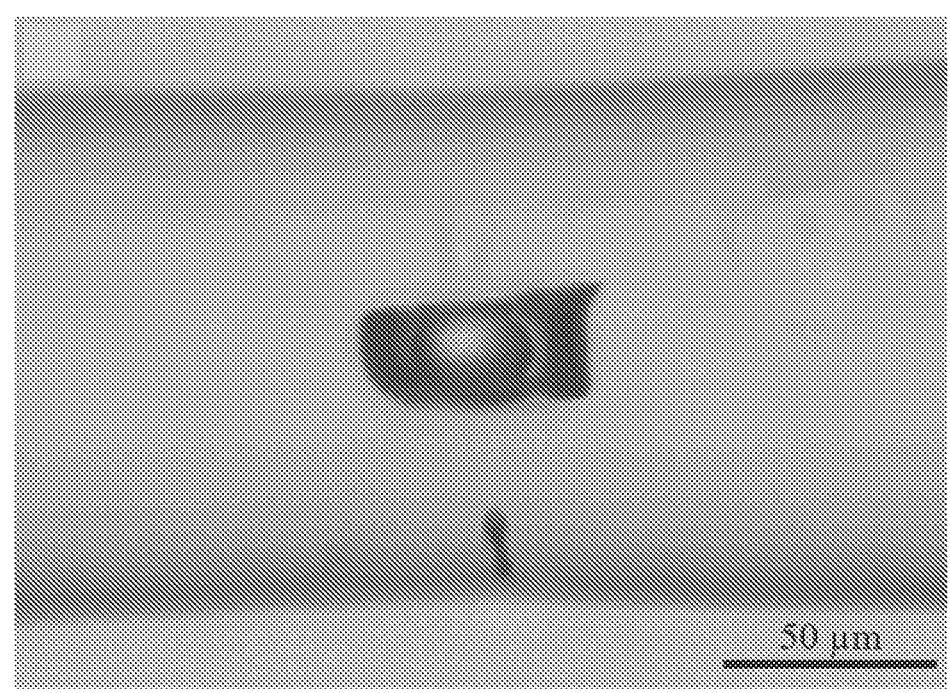
Figures 10A, 10B:
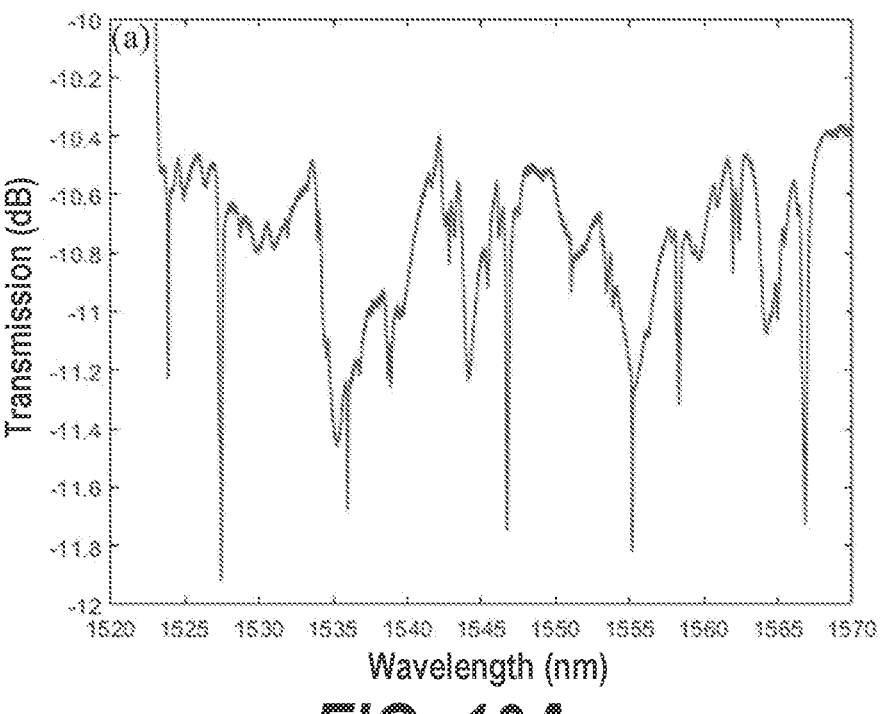
FIG. 10A illustrates examples of a measured transmission spectrum of the free-space coupling structure shown in FIGS. 9A and 9B according to various embodiments of the present disclosure.
FIG. 10B illustrates an example resonance and a Lorentzian fitting of the free-space coupling structure shown in FIGS. 9A and 9B according to various embodiments of the present disclosure.

At least two designs were demonstrated by the purposed fabrication method and characterized. The first design is based on micro-cylinder resonator 115 and totally-internal-reflection coupler 115. The second design is based on micro-cylinder resonator 110 and free-space coupling. The image of the fabricated device is shown in FIGS. 7A and B, and FIGS. 9A and 9B, and characterization results are plotted in FIGS. 8A-8B and FIGS. 10A-10B, respectively.

Those results demonstrate the functionality of the purposed structure and feasibility of the purposed fabrication technique.

Figure 11:
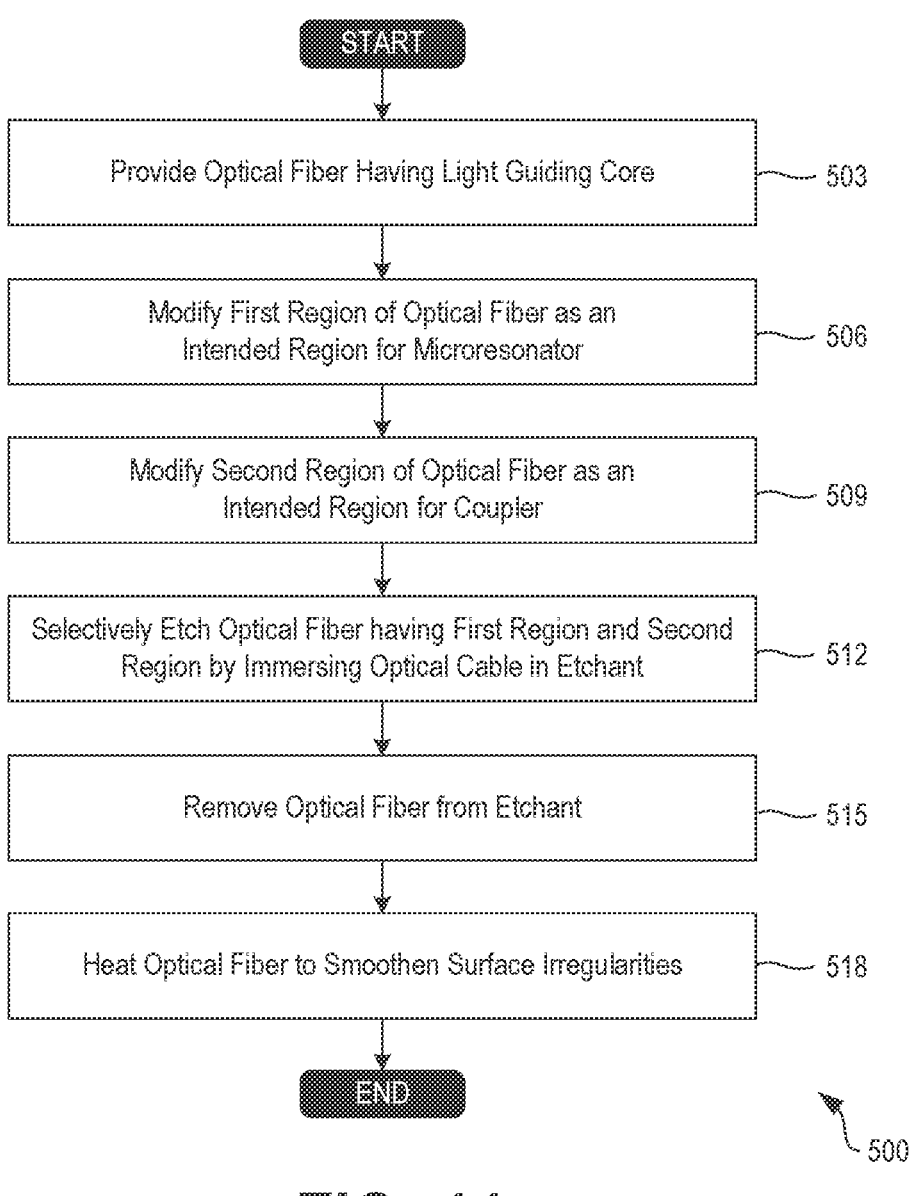
FIG. 11 is a flowchart illustrating an example method for formatting the optical fiber of FIG. 1 according to various embodiments of the present disclosure.

Referring next to FIG. 11, shown is a flowchart 500 that provides one example of the operation of forming an optical fiber 100 and/or forming components of an optical fiber 100 according to various embodiments, such as microresonators 110 and/or couplers 115. It is understood that the flowchart of FIG. 11 provides merely an example of the many different types of functional arrangements that may be employed to implement the operation of forming an optical fiber and/or forming components of an optical fiber as described herein.

Beginning with box 503, an optical fiber 100 having a light guiding core 105 is provided. The optical fiber 100 may include a glass fiber, for example. To this end, the glass fiber 100 may be pure-fused silica. Alternatively, the optical fiber 100 may be a glass fiber, where the glass fiber is doped silica doped using a dopant selected from a group consisting of germanium (Ge), phosphorus (P), fluorine (F), and rare earth ions (erbium (Er), ytterbium (Yb), neodymium (Nd), thulium (Tm), praseodymium (Pr), holmium (Ho). A shape of the optical fiber 100 (e.g., a cross-section of the optical fiber 100) may be one of cylindrical, rectangular, triangular, and polygonal. Further, in some embodiments, a size of the optical fiber 100 may be in a range of tens of micrometers or tens of sub-millimeters.

At least one region of the optical fiber 100 may be modified. For instance, in box 506, a first region of the optical fiber 100 may be modified and, at box 509, a second region of the optical fiber 100 may be modified using a laser or other suitable modification apparatus. The first region, for instance, may be a region for an intended microresonator 110, the second region may be for an intended coupler 115, and so forth. It is understood that box 506 and 509 may be repeated to product a desired number of components (e.g., a desired number of microresonators 110, couplers 115, and/or the like). It is also understood that box 509 is optional and only a single region may be modified in some embodiments.

In some embodiments, modifying the at least one region of the optical fiber 100 using, for example, a laser, may include adjusting a pulse width of the laser to a femtosecond or a picosecond setting and/or adjusting a wavelength of the laser to ultraviolet, visible, or near-infrared. In some embodiments, the laser may include an ultrafast laser, as may be appreciated.

At box 512, the optical fiber 100 is having the at least one region as modified is selectively etched by immersing the optical fiber 100 inside an etchant that selectively etches the at least one region as modified to generate at least one of a microresonator 110 and a coupler 115 integrated in the optical fiber 100 at or near the light guiding core 105, as may be appreciated. The etchant may include hydrofluoric acid (HF), potassium hydroxide (KOH), or a combination thereof, although other etchants may be employed if suitable to remove the modified regions of the optical fiber 100.

At box 515, the optical fiber 100 is removed from the etchant. The optical fiber as removed from the etchant may include the at least one of the microresonator 110 and the coupler 115 (as well as other components as modified by the laser in box 506 and box 509).

Finally, at box 518, after removing the optical fiber 100 from the etchant, the optical fiber 100 may be heated to smoothen surface irregularities of the at least one of the microresonator 110 and/or the coupler 115. In some embodiments, heating the optical fiber comprises performing a laser reflow process on the optical fiber using a carbon dioxide ($CO_2$) laser that heats and irradiates the optical fiber 100. It is understood, however, that other heating processes, such as a furnace, electric arcs, flame, or combination thereof, may be employed.

In some embodiments, the optical fiber 100 as modified includes a microresonator 110 and a coupler 115. The microresonator may have a shape selected from a group consisting of a sphere, a cylinder, a toroid, and a polygon, although other shapes may be employed. The coupler 115 may be one of a waveguide coupler, a free-space coupler, a total-internal-reflection (TIR) coupler, although other types of couplers may be employed.

The optical fiber 100 may include the microresonator 110, where the microresonator 110 is one of a multitude of microresonators 110 integrated in the optical fiber 100. Further, the optical fiber 100 may include the coupler 115, where the coupler 115 is one of a multitude of couplers 115 integrated in the optical fiber 100. Thereafter, the process may proceed to completion.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. If a component is described as having "one or more" of the component, it is understood that the component can be referred to as "at least one" component.

The terms "first," "second," etc. are used only as labels, rather than a limitation for a number of the objects. It is understood that if multiple components are shown, the components may be referred to as a "first" component, a "second" component, and so forth, to the extent applicable.

Although the flowchart of FIG. 11 shows a specific order of execution, it is understood that the order of execution may differ from that which is depicted. For example, the order of execution of two or more blocks may be scrambled relative to the order shown. Also, two or more blocks shown in succession in FIG. 11 may be executed concurrently or with partial concurrence. Further, in some embodiments, one or more of the blocks shown in FIG. 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Clause 1. A method for forming an optical fiber having a microresonator and a coupler integrated therein, comprising: providing an optical fiber having a light guiding core; modifying a first region of the optical fiber as an intended region for the microresonator and a second region of the optical fiber as an intended region for the coupler using an ultrafast laser; immersing the optical fiber having the first region and the second region as modified inside an etchant that selectively etches the first region and the second region as modified to generate the microresonator and the coupler integrated in the optical fiber at the light guiding core, wherein the etchant is hydrofluoric acid (HF), potassium hydroxide (KOH), or a combination thereof; removing the optical fiber from the etchant; and heating the optical fiber to smoothen surface irregularities of the microresonator and the coupler, wherein heating the optical fiber comprises performing at least one of: a laser reflow process on the optical fiber using a carbon dioxide ($CO_2$) laser that irradiates and heats the optical fiber or and performing direct heating using a heating apparatus, wherein the heating apparatus is at least one of a furnace, electric arcs, and a flame.

Clause 2. The method according to clause 1, wherein modifying the first region and the second region of the optical fiber using the ultrafast laser comprises: adjusting a pulse width of the ultrafast laser to a femtosecond or a picosecond setting; and adjusting a wavelength of the ultrafast laser to ultraviolet, visible, or near-infrared.

Clause 3. The method according to any of clauses 1-2, wherein: the microresonator has a shape selected from a group consisting of: a sphere, a cylinder, a toroid, and a polygon; and the coupler is one of: a waveguide coupler; a free-space coupler; and a total-internal-reflection (TIR) coupler.

Clause 4. An optical fiber formed according to the method of clause 1.

Clause 5. The optical fiber according to clause 4, wherein: the microresonator is a first microresonator; the optical fiber comprises a second microresonator; and the coupler couples the first microresonator and the second microresonator.

Clause 6. The optical fiber according to any of clauses 4-5, wherein the coupler couples the first microresonator and the second microresonator in an axial dimension.

Clause 7. The optical fiber according to any of clauses 1-6, wherein the coupler couples the first microresonator and the second microresonator in an azimuthal dimension.

Clause 8. A method for forming an optical fiber having at least one of a microresonator and a coupler integrated therein, comprising: providing an optical fiber having a light guiding core; modifying at least one region of the optical fiber using a laser; immersing the optical fiber having the at least one region as modified inside an etchant that selectively etches the at least one region as modified to generate at least one of a microresonator and a coupler integrated in the optical fiber at the light guiding core; and removing the optical fiber from the etchant, wherein the optical fiber as removed from the etchant comprises the at least one of the microresonator and the coupler.

Clause 9. The method according to clause 8, further comprising, after removing the optical fiber from the etchant, heating the optical fiber to smoothen surface irregularities of the at least one of the microresonator and the coupler.

Clause 10. The method according to any of clauses 8-9, wherein heating the optical fiber comprises performing a laser reflow process on the optical fiber using a carbon dioxide ($CO_2$) laser that irradiates and heats the optical fiber, or performing direct heating wherein the heating apparatus is a furnace, electric arcs, a flame, or any combination thereof.

Clause 11. The method according to any of clauses 8-10, modifying the at least one region of the optical fiber using the laser comprises: adjusting a pulse width of the laser to a femtosecond or a picosecond setting; and adjusting a wavelength of the laser to ultraviolet, visible, or near-infrared, wherein the laser is an ultrafast laser.

Clause 12. The method according to any of clauses 8-11, wherein the etchant is hydrofluoric acid (HF), potassium hydroxide (KOH), or a combination thereof.

Clause 13. The method according to any of clauses 8-12, wherein the optical fiber comprises a glass fiber, wherein the glass fiber is pure-fused silica.

Clause 14. The method according to any of clauses 8-13, wherein the optical fiber comprises a glass fiber, wherein the glass fiber is doped silica doped using a dopant selected from a group consisting of: germanium (Ge), phosphorus (P), fluorine (F), and rare earth ions (erbium (Er), ytterbium (Yb), neodymium (Nd), thulium (Tm), praseodymium (Pr), holmium (Ho).

Clause 15. The method according to any of clauses 8-14, wherein: a shape of the optical fiber is one of cylindrical, rectangular, triangular, and polygonal; and a size of the optical fiber is in a range of tens of micrometers or tens of sub-millimeters.

Clause 16. The method according to any of clauses 8-15, wherein: the optical fiber comprises the microresonator and the coupler; the microresonator has a shape selected from a group consisting of: a sphere, a cylinder, a toroid, and a polygon; and the coupler is one of: a waveguide coupler; a free-space coupler; and a total-internal-reflection (TIR) coupler.

Clause 17. The method according to any of clauses 8-16, wherein: the optical fiber comprises the microresonator, the microresonator being one of a plurality of microresonators integrated in the optical fiber; and the optical fiber comprises the coupler, the coupler being one of a plurality of couplers integrated in the optical fiber.

Clause 18. An optical fiber formed according to the method of clause 8.

Clause 19. The optical fiber according to clause 18, wherein: the optical fiber comprises both the microresonator and the coupler; the microresonator is a first microresonator; the optical fiber further comprises a second microresonator; and the coupler couples the first microresonator and the second microresonator.

Clause 20. The optical fiber according to clause 19, wherein the coupler couples the first microresonator and the second microresonator in an axial dimension or an azimuthal dimension.

Therefore, the following is claimed:

1. A method for forming an optical fiber having at least one microresonator and at least one coupler integrated therein, comprising:
   providing an optical fiber having a light guiding core;
   modifying a first region of the optical fiber as an intended region for the at least one microresonator and a second region of the optical fiber as an intended region for the at least one coupler using an ultrafast laser;
   immersing the optical fiber having the first region and the second region as modified inside an etchant to selectively etch the first region and the second region as modified and thereby shape the at least one microresonator and the at least one coupler integrated in the optical fiber at the light guiding core, wherein the etchant is hydrofluoric acid (HF), potassium hydroxide (KOH), or a combination thereof;
   removing the optical fiber from the etchant; and
   heating the optical fiber to smoothen surface irregularities of the at least one microresonator and the at least one coupler, wherein heating the optical fiber comprises performing at least one of: a laser reflow process on the optical fiber using a carbon dioxide ($CO_2$) laser to irradiate and heat the optical fiber and direct heating using a heating apparatus, wherein the heating apparatus is at least one of a furnace, electric arcs, and a flame,
   wherein the at least one microresonator comprises at least two microresonators that share a common coupler and are oriented in different azimuthal dimensions from one another.

2. The method according to claim 1, wherein modifying the first region and the second region of the optical fiber using the ultrafast laser comprises:
   adjusting a pulse width of the ultrafast laser to a femtosecond setting or a picosecond setting; and
   adjusting a wavelength of the ultrafast laser to ultraviolet, visible, or near-infrared.

3. The method according to claim 1, wherein:
   the at least one microresonator has a shape selected from a group consisting of: a sphere, a cylinder, a toroid, and a polygon; and
   the at least one coupler is one of: a waveguide coupler; a free-space coupler, and a total-internal-reflection (TIR) coupler.

4. An optical fiber formed according to the method of claim 1.

5. The optical fiber according to claim 4, wherein:
   the microresonator is a first microresonator;
   the optical fiber comprises a second microresonator; and
   the coupler couples the first microresonator and the second microresonator.

6. The optical fiber according to claim 5, wherein the coupler couples the first microresonator and the second microresonator in an axial dimension.

7. A method for forming an optical fiber having at least one of a microresonator and a coupler integrated therein, comprising:

providing an optical fiber having a light guiding core;

modifying at least one region of the optical fiber using a laser;

immersing the optical fiber having the at least one region as modified inside an etchant to selectively etch the at least one region as modified and thereby shape at least one of the microresonator and the coupler integrated in the optical fiber at the light guiding core; and removing the optical fiber from the etchant, wherein the optical fiber as removed from the etchant comprises the at least one of the microresonator and the coupler, wherein the microresonator comprises at least two microresonators that share a common coupler and are oriented in different azimuthal dimensions from one another.

8. The method according to claim 7, further comprising, after removing the optical fiber from the etchant, heating the optical fiber to smoothen surface irregularities of the at least one of the microresonator and the coupler.

9. The method according to claim 8, wherein heating the optical fiber comprises at least one of: performing a laser reflow process on the optical fiber using a carbon dioxide ($CO_2$) laser to irradiates and heat the optical fiber and direct heating using a heating apparatus, wherein the heating apparatus is one of a furnace, electric arcs, and a flame.

10. The method according to claim 7, modifying the at least one region of the optical fiber using the laser comprises:

adjusting a pulse width of the laser to a femtosecond setting or a picosecond setting, and adjusting a wavelength of the laser to ultraviolet, visible, or near-infrared, wherein the laser is an ultrafast laser.

11. The method according to claim 7, wherein the etchant is hydrofluoric acid (HF), potassium hydroxide (KOH), or a combination thereof.

12. The method according to claim 7, wherein the optical fiber comprises a glass fiber, and wherein the glass fiber is formed from pure-fused silica.

13. The method according to claim 7, wherein the optical fiber comprises a glass fiber, and wherein the glass fiber is formed from doped silica doped using a dopant selected from a group consisting of: germanium (Ge), phosphorus (P), fluorine (F), and rare earth ions (erbium (Er), ytterbium (Yb), neodymium (Nd), thulium (Tm), praseodymium (Pr), and holmium (Ho).

14. The method according to claim 7, wherein:

a shape of the optical fiber is one of cylindrical, rectangular, triangular, and polygonal; and a size of the optical fiber is in a range of tens of micrometers or tens of sub-millimeters.

15. The method according to claim 7, wherein:

the optical fiber comprises the microresonator and the coupler;

the microresonator has a shape selected from a group consisting of: a sphere, a cylinder, a toroid, and a polygon; and the coupler is one of: a waveguide coupler; a free-space coupler; and a total-internal-reflection (TIR) coupler.

16. The method according to claim 7, wherein:

the optical fiber comprises the microresonator, the microresonator being one of a plurality of microresonators integrated in the optical fiber; and the optical fiber comprises the coupler, the coupler being one of a plurality of couplers integrated in the optical fiber.

17. An optical fiber formed according to the method of claim 7.

18. The optical fiber according to claim 17, wherein:

the optical fiber comprises both the microresonator and the coupler;

the microresonator is a first microresonator;

the optical fiber further comprises a second microresonator; and the coupler couples the first microresonator and the second microresonator.

* * * * *